United States Patent [19]

Hohensee et al.

[11] Patent Number: 5,717,922
[45] Date of Patent: Feb. 10, 1998

[54] METHOD AND SYSTEM FOR MANAGEMENT OF LOGICAL LINKS BETWEEN DOCUMENT ELEMENTS DURING DOCUMENT INTERCHANGE

[75] Inventors: Reinhard Heinrich Hohensee; Jerold Russell Sampson, both of Boulder, Colo.

[73] Assignee: International Business Machines Corporation, Armonk, N.Y.

[21] Appl. No.: 509,636

[22] Filed: Jul. 31, 1995

[51] Int. Cl.$^6$ ............................................. G06F 17/30
[52] U.S. Cl. ............................................. 395/611; 707/102
[58] Field of Search .............................. 395/611, 800, 395/774, 777, 786, 613

[56] References Cited

U.S. PATENT DOCUMENTS

| | | | |
|---|---|---|---|
| 4,539,653 | 9/1985 | Bartlett et al. | 395/782 |
| 4,833,641 | 5/1989 | Lerner | 395/703 |
| 4,864,497 | 9/1989 | Lowry et al. | 395/613 |
| 4,969,093 | 11/1990 | Barker et al. | 395/800 |
| 5,144,555 | 9/1992 | Takadachi et al. | 395/792 |
| 5,181,162 | 1/1993 | Smith et al. | 395/792 |
| 5,404,435 | 4/1995 | Rosenbaum | 395/777 |
| 5,421,028 | 5/1995 | Swanson | 395/800 |
| 5,437,038 | 7/1995 | Silberbauer et al. | 395/200.03 |
| 5,446,488 | 8/1995 | Vogel | 348/3 |
| 5,459,827 | 10/1995 | Allouche et al. | 395/774 |
| 5,499,329 | 3/1996 | Motoyama et al. | 395/774 |
| 5,535,319 | 7/1996 | Pascoe et al. | 395/786 |

*Primary Examiner*—Paul R. Lintz
*Attorney, Agent, or Firm*—Felsman, Bradley, Gunter & Dillion, LLP

[57] ABSTRACT

A method and system for managing logical links between document components within a presentation data stream which includes a continuous ordered stream of uniquely identified data objects and associated elements. The processing of presentation form documents has been extended from hard copy devices into interactive presentation forms which accommodate sophisticated navigation techniques such as hypertext. In order to accommodate this process a link logical element (LLE) is defined within the document presentation data stream which identifies a source component and a target component for a logical link. Multiple purpose links which provide navigational linkage, annotational linkage and append linkage are provided and the link logical element further includes a field which specifies the purpose of a particular link. Optional fields are also provided which may be utilized to pass parameters to the target component upon processing the link. In this manner a receiver of the data stream may selectively process or ignore a particular logical link.

9 Claims, 3 Drawing Sheets

30 — Structured Field Introducer

| SF Length | ID = X'D3B490' | Flags | Sequence Number | Structured Field Data |
|---|---|---|---|---|

32 —

| Offset | Type | Name | Range | Meaning | M/O | Exc |
|---|---|---|---|---|---|---|
| 0 | CODE | LnkType | | Link Type | M | X'06' |
| | | | X'01' | Navigation link | | |
| | | | X'02' | Annotation link | | |
| | | | X'03' | Append link | | |
| 1 | | | | Reserved; must be set to zero | M | X'06' |
| Two or three repeating groups in the following format: | | | | | | |
| 0-1 | UBIN | RGLength | 3-(n+1) | Total length of this repeating group | M | X'06' |
| 2 | CODE | RGFunct | | Repeating group function | M | X'06' |
| | | | X'01' | Link attribute specification | | |
| | | | X'02' | Link source specification | | |
| | | | X'03' | Link target specification | | |
| 3-n | | Triplets | | Various | O | X'10' |

| Structured Field Introducer | | | | Structured Field Data |
|---|---|---|---|---|
| SF Length | ID = X'D3B490' | Flags | Sequence Number | |

30 ↱ (Structured Field Introducer)

32 ↱

| Offset | Type | Name | Range | Meaning | M/O | Exc |
|---|---|---|---|---|---|---|
| 0 | CODE | LnkType | | Link Type | M | X'06' |
| | | | X'01' | Navigation link | | |
| | | | X'02' | Annotation link | | |
| | | | X'03' | Append link | | |
| 1 | | | | Reserved; must be set to zero | M | X'06' |
| Two or three repeating groups in the following format: | | | | | | |
| 0-1 | UBIN | RGLength | 3-(n+1) | Total length of this repeating group | M | X'06' |
| 2 | CODE | RGFunct | | Repeating group function | M | X'06' |
| | | | X'01' | Link attribute specification | | |
| | | | X'02' | Link source specification | | |
| | | | X'03' | Link target specification | | |
| 3-n | Triplets | | | Various | O | X'10' |

*Fig. 2*

METHOD AND SYSTEM FOR MANAGEMENT OF LOGICAL LINKS BETWEEN DOCUMENT ELEMENTS DURING DOCUMENT INTERCHANGE

BACKGROUND OF THE INVENTION

1. Documents Incorporated by Reference

This invention discloses a method and system for management of logical links between document elements during document interchange within the Mixed Object Document Content Architecture (MO:DCA) used within a presentation data stream for document interchange. Background material for an understanding of this invention is incorporated by reference from *Mixed Object Document Content Architecture Reference*, IBM Publication SC31-6802-03, 1994 and will be referred to herein as Mixed Object Document Content Architecture (MO:DCA).

2. Background of the Invention

The present invention relates in general to an improved method and system for presentation data stream management and in particular to an improved method and system for presentation data stream management which supports logical links between various document components within the data stream. Still more particularly, the present invention relates to an improved method and system for presentation data stream management which supports logical links between various document components within the data stream and which explicitly identifies the purpose of each link so that the link may be selectively processed or ignored by a receiver.

3. Description of the Related Art

Presentation architectures are provided for representing documents in a data format which is independent of the methods utilized to capture or create those documents. Documents may contain combinations of text, image, graphics, and/or bar code objects in device and resolution independent formats. Documents may also contain fonts, overlays and other resource objects which are required at presentation time to present the data properly. Additionally, documents may also contain resource objects, such as a document index and tagging elements supporting the search and navigation of document data, for a variety of application purposes.

A data stream is a continuous ordered stream of data elements and objects which conform to a given format. Application programs can generate data streams destined for a presentation service, archive library or another application program. The Mixed Object Document Content Architecture (MO:DCA) developed by International Business Machines Corporation of Armonk, N.Y. defines a data stream which may be utilized by applications to describe documents and object envelopes for interchange with other applications and application services. Documents which are defined in the Mixed Object Document Content Architecture (MO:DCA) format may be archived in a database, later retrieved, viewed, annotated and printed in local or distributed system environments. Presentation fidelity is accommodated by including resource objects in the documents that reference those objects.

A mixed object document is a collection of data objects which comprise the document's content and the resources and formatting specifications which dictate the processing functions to be performed on that content. The term "Mixed" in the Mixed Object Document Content Architecture (MO:DCA) refers to both the mixture of data objects and the mixture of document constructs that comprise the document's components. A Mixed Object Document Content Architecture (MO:DCA) can contain a mixture of presentation data objects. Each data object type has a unique processing requirement.

The Mixed Object Document Content Architecture (MO:DCA) is designed to facilitate document interchange as well as document exchange. Interchange is the predictable interpretation of shared information in an environment where the characteristics of each process need not be known to all other processes. Exchange is the predictable interpretation of shared information by a family of system processes in an environment where the characteristics of each process must be known to all other processes.

The Mixed Object Document Content Architecture (MO:DCA) is designed to integrate the different data object types into documents that can be interchanged as a single data stream. The Mixed Object Document Content Architecture (MO:DCA) provides the data stream structures need to carry the data objects. The data stream also provides syntactic and semantic rules governing the use of those objects to ensure that different applications process those objects in a consistent manner.

In its most complex form, a Mixed Object Document Content Architecture (MO:DCA) contains data objects along with data structures which define the document's layout and composition features. This form is called a Mixed Object Document Content Architecture (MO:DCA) presentation document. Within such a data stream the Mixed Object Document Content Architecture (MO:DCA) components are defined with a syntax that consists of self-describing structures. Structured fields are the main Mixed Object Document Content Architecture (MO:DCA) structures and are utilized to encode Mixed Object Document Content Architecture (MO:DCA) commands. A structured field typically starts with an introducer that uniquely identifies the command, provides a total length for the command, and specifies additional control information such as whether padding bytes are present. The introducer is then followed by up to 32,759 data bytes. Data may be encoded within the structured field utilizing fixed parameters, repeating groups, key words and triplets. Fixed parameters have a meaning only in the context of the structure that includes them. Repeating groups are utilized to specify grouping of parameters that can appear multiple times. Key words are self-identifying parameters that consist of a one byte unique key word identifier followed by a one byte keyword value. Triplets are self-identifying parameters that contain a one byte length, a one byte unique triplet identifier and up to 252 data bytes. Key words and triplets have the same semantics whenever they are utilized. Together these structures define a syntax for Mixed Object Document Content Architecture (MO:DCA) data streams which provide for orderly parsing and flexible extendibility.

The document is the highest level within the Mixed Object Document Content Architecture (MO:DCA) data stream document component hierarchy. Documents may be constructed of pages, and the pages, which are at the intermediate level, may be made up of objects. Objects are at the lowest level and can be bar codes, graphics, images and presentation text.

A Mixed Object Document Content Architecture (MO:DCA) document in its presentation form is a document which has been formatted and is intended for presentation, usually on a printer or a display device. A data stream containing a presentation document should produce the same document content in the same format on different printers or display devices dependent, however, on the capabilities of each of the printers or display devices. A presentation document can reference resources that are to be included as part of the document to be presented which are not present within the data stream.

Pages within the Mixed Object Document Content Architecture (MO:DCA) are the level within the document component hierarchy which is utilized to printing or displaying a document's content. Data objects contained within each page envelope in the data stream are presented when the page is presented. Each data object has layout information associated with it that directs the placement and orientation of the data on the page. In addition, each page contains layout information and specifies the measurement units, page width and page depth.

Data objects within the Mixed Object Document Content Architecture (MO:DCA) contain the data which is to be presented. Such objects may also contain environment information needed to establish the proper location and orientation for the data on the presentation surface. Objects in the data stream are bounded by delimiters that identify the object type, such as graphics, image or text. The Mixed Object Document Content Architecture (MO:DCA) supports two categories of objects: data objects, and resource objects. In general data objects consist of data to be presented and the directives required to present it. The content of each type of data object is defined by an object architecture that specifies presentation functions which may be utilized within its coordinate space. All data objects function as equals within the Mixed Object Document Content Architecture (MO:DCA) data stream environment. Data objects are carried as separate entities with no dependencies on the Mixed Object Document Content Architecture (MO:DCA) layout structures or the containing data stream environment. Resource objects are named objects or named collection of objects that can be referenced from within the document. In general, referenced resources can reside in a resource group that precedes the document or in an external resource library and can be referenced over and over.

An object container within the Mixed Object Document Content Architecture (MO:DCA) is an envelope for object data that may not be defined by an International Business Machines Corporation presentation architecture and that may not define all required prosecution parameters. The container consists of a mandatory Begin/End structured field pair, an optional Object Environment Group (OEG) and optional Object Container Data (OCD) structured fields. If an object is to be carried in Mixed Object Document Content Architecture (MO:DCA) resource groups and interchanged, it must, at a minimum, be enveloped by a Begin/End pair, and the Object Classification triplet on the Begin structured field must specify the registered object identifier (OLD) for the object data format.

The processing of final-form or presentation document data streams is currently being extended from presentation on hard-copy devices such as printers to presentation on viewers which include interactive functions such as context-based navigation and annotation. When applied to a final-form document presentation data stream, such as that defined by Mixed Object Document Content Architecture (MO:DCA) document presentation data stream, these new functions require a method of defining logical links between the various document components. Further, it would be useful to provide a definition for such logical links which identifies the source, target and the purpose of the link such that receivers of the document data stream can parse the identifying structure and dynamically determine whether to process or ignore the link.

SUMMARY OF THE INVENTION

It is another object of the present invention to provide an improved method and system for data stream management.

It is yet another object of the present invention to provide an improved method and system for data stream management which supports logical links between various document components within the data stream.

It is still another object of the present invention to provide an improved method and system for data stream management which supports logical links between various document components within the data stream and which explicitly identifies the purpose of each link so that the link may be selectively processed or ignored by a receiver.

The foregoing objects are achieved as is now described. A method and system for managing logical links between document components within a presentation data stream which includes a continuous ordered stream of uniquely identified data objects and associated elements is provided. The processing of presentation form documents has been extended from hard copy devices into interactive presentation forms which accommodate sophisticated navigation techniques such as hypertext. In order to accommodate this process a link logical element (LLE) is defined within the document presentation data stream which identifies a source component and a target component for a logical link. Multiple purpose links which provide navigation linkage, annotation linkage and append linkage are provided and the link logical element (LLE) further includes a field which specifies the purpose of a particular link. Optional fields are also provided which may be utilized to pass parameters to the target component upon processing the link. In this manner a receiver of the data stream may selectively process or ignore a particular logical link.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 is a tabular representation of the syntax of a link logical element (LLE) structured field utilized in accordance with the method and system of the present invention.

DETAILED DESCRIPTION OF PREFERRED EMBODIMENT

Figure 1:
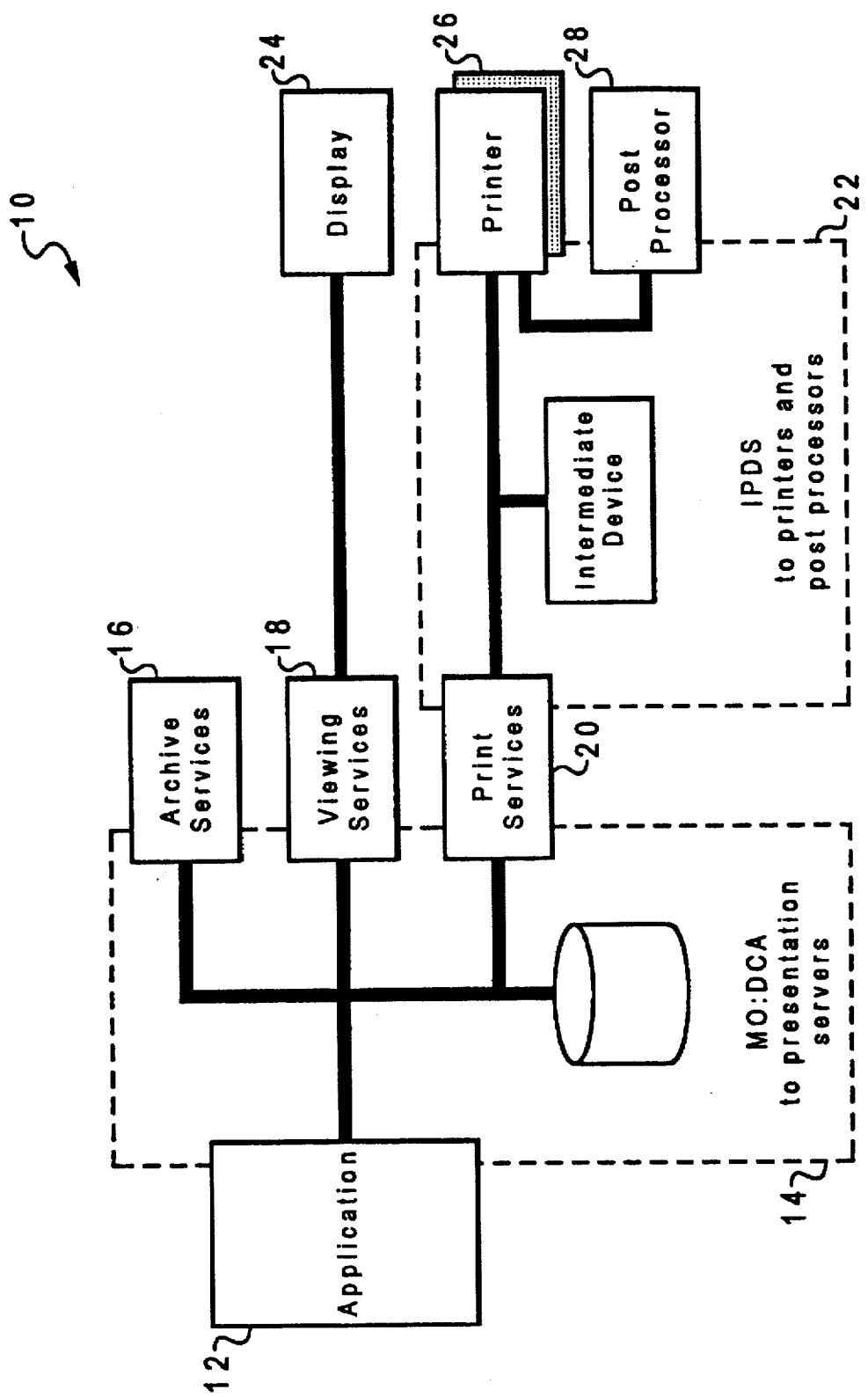
FIG. 1 depicts a pictorial representation of a system model relating Mixed Object Document Content Architecture (MO:DCA) and printer data streams to a presentation environment.

With reference now to the figures and in particular with reference to FIG. 1, there is depicted a pictorial representation of a system model relating Mixed Object Document Content Architecture (MO:DCA) and printer data streams to a presentation environment. As illustrated, a system 10 is depicted in which an application 12 can generate a data stream which is destined for a presentation service 20, an archive service 16 or a viewing service 18. The so-called "Intelligent Printer Data Stream (IPDS)" architecture may be utilized to further modify and define the data stream for utilization by print server programs and device drivers to manage an all-points-addressable page printing on a full spectrum of devices from low-end workstations and local area network-attached printers to high speed, high volume page printers for production jobs, shared printing and mail room applications. Thus, printer 26 and post processor 28 may utilize a data stream in the IPDS format.

Referring now to FIG. 2 there is depicted a tabular representation of the syntax of a link logical element (LLE) structured field utilized in accordance with the method and system of the present invention. As depicted at reference numeral 30, the link logical element (LLE) structured field includes a structured field introducer which specifies the structured field link, the identity of the structured field, any flags or bits which may identify whether or not the structured field is segmented or if a structured field extender or padding is to be utilized, a two-byte field sequence number utilized to enable users to identify structured field sequences and the structured field data which provides the structured field's effect.

The syntax for the link logical element (LLE) structured field data is shown at reference numeral 32. As depicted, the syntax includes an offset value in bytes and the type of field. A name for the particular field is provided, if applicable, and the appropriate range of valid values for that field are also specified. The meaning or purpose of the data element is set forth under the column "Meaning". Finally, an indication of whether or not the field is mandatory or optional and whether or not an exception code for the exception conditions which are possible for this dead element is also provided.

Thus, as illustrated within FIG. 2, the link logical element (LLE) structured field includes the link type (LnkType) which specifies the purpose of the linkage. As illustrated, the link type may include a navigation link, an annotation link or an append link. As utilized herein a navigation link is a link type which specifies the linkage from a source document component to a contextually-related target document component. Navigation links may be utilized to support applications such as hypertext and hypermedia. Next, the link may also comprise a annotation link which specifies the linkage from a source document component to a target document component that contains an annotation. Finally, an append link specifies the linkage from the end of a source document component to a target document component which contains an append.

Additionally, two or three repeating groups are provided which specify the repeating group length, indicating the total length of a particular repeating group (RGLength) and the repeating group function (RGFunct) which identifies the function of the repeating group. The repeating group function may specify the link attribute, the link source and the link target for a particular logical link. Thus, every link logical element (LLE) structured field must contain one repeating group which specifies the source of the logical link, and one repeating group which specifies the target of the logical link. Every link logical element (LLE) structured field may also optionally contain one additional repeating group which specifies attributes of the link.

The optional attribute repeating group can be utilized to specify attributes and data that applied to the whole link, such as the name of the link logical element (LLE) structured field, the code page and character set utilized to encode character data in the link logical element (LLE) structured field, and parameter data to be passed from the source component to the target component or to be associated with the link. In this manner, for example, search parameters associated with the source document may be passed to a target document component and utilized to implement a search for similar or related parameters.

The source and target repeating groups specify the document components that are the source and target of the link and may further restrict the source and target to rectangular areas on the corresponding document component presentation spaces. The source and target repeating groups may qualify the name of the document component with the names of the document components that are higher in the document hierarchy. For example, if the target of the link is a page, the target repeating group may specify the name of the page, the name of the page group that contains the page, and the name of the document that contains the page group. If the names of the document components that are higher in the document hierarchy are not explicitly specified within the link logical element (LLE) repeating groups, those names are inherited from the document components that contain the link logical element (LLE) structured field. For example, if a source repeating group only specifies an area, then the link logical element (LLE) structured field must be located within a page or overlay definition, and the name of the page or overlay, as well as the name of the document, are inherited by the source repeating group.

In general, source and target repeating groups may specify multiple document components names, however, within each repeating group the identified document components must all be part of the same document hierarchy, and the actual source or target of the link is determined by the lowest specified member of that document component hierarchy.

In accordance with the method and system of the present invention the document components which may be specified as source or target components include the document, the page group, the page, the overlay, a process element (such as a logical tag element), a rectangular area or other object data such as non-native data objects which do not conform to the Mixed Object Document Content Architecture (MO:DCA).

Additionally, various triplets may appear in the link logical element (LLE) structured field within the repeating groups to specify a coded graphic character set global identifier, a fully qualified name for a process element, an object classification, measurement units or an area definition which defines a rectangular area on the presentation space of the lowest document component in the document hierarchy that is specified by the repeating group or that is inherited by the repeating group. Additionally, as set forth above, parameters to be utilized by the target component may be passed from the source component, within the optional triplets. If the repeating group does not explicitly specify an object, then the object specification is inherited from the document hierarchy, as set forth above. Thus, an area definition will be defined on the presentation space for the page which contains a link logical element (LLE) structured field and the units of measurement for resolving the offset and size of the area are specified by a measurement unit triplet, as described above.

Thus, as those skilled in the art will appreciate upon reference to the foregoing, by specifying the source and target components for a logical link and specifying the purpose of the logical link, the efficiency of processing a presentation data stream may be greatly enhanced by permitting the receiver to elect to process or ignore a logical link, having been made aware of the purpose of that logical link utilizing the link logical element (LLE) structured field described herein.

Figure 3:
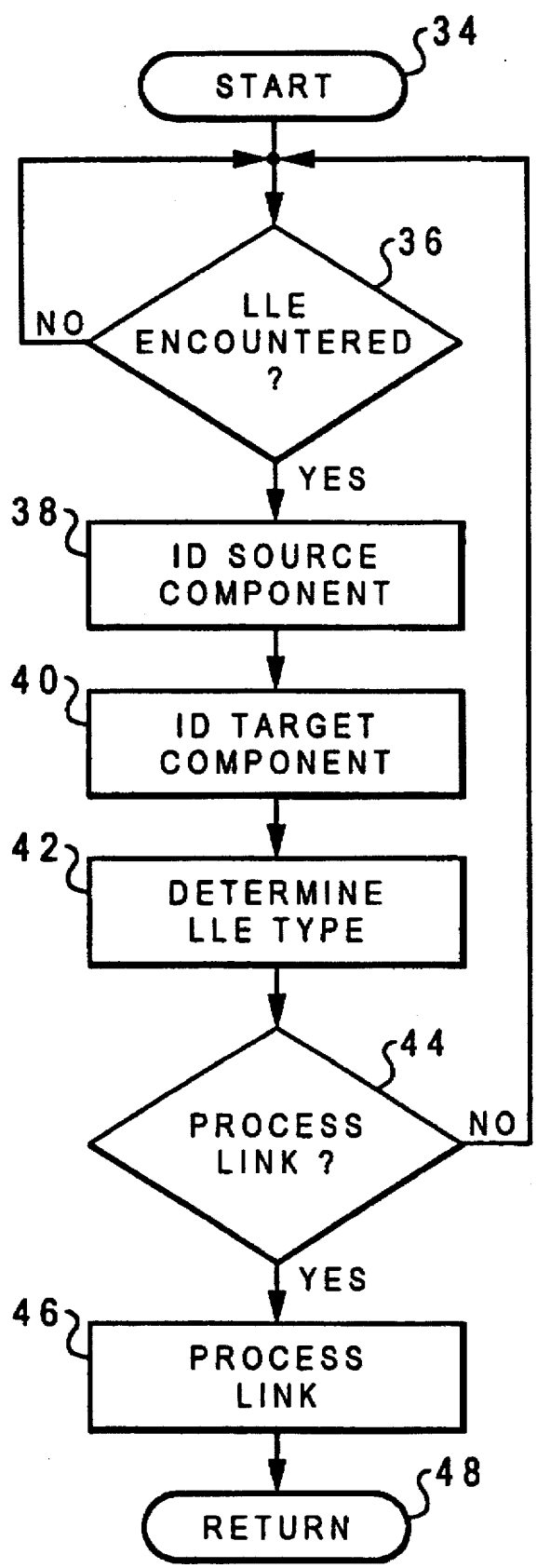
FIG. 3 is a high level logic flowchart illustrating a process for implementing the method of the present invention within a data processing system.

With reference now to FIG. 3, there is illustrated a high level logic flowchart which depicts a process for implementing the method of the present invention within a data processing system. As illustrated, this process begins at block 34 and thereafter passes to block 36. Block 36 illustrates a determination of whether or not a link logical element (LLE) has been encountered during the processing of a presentation data stream. If not, the process merely iterates until such time as a link logical element (LLE) is encountered.

Still referring to block 36, in the event a link logical element (LLE) is encountered, the process passes to block 38. Block 38 illustrates the identification of the source component for the specified logical link. The process then passes to block 40 which illustrates the identification of the target component for the logical link.

Next, the process passes to block 42 which depicts a determination of the purpose for the specified logical link. That is, whether or not the logical link is a navigation link, an annotation link, or an append link. Thereafter the process passes to block 42. Block 42 illustrates a determination by the receiver of the data stream whether the identified logical link is to be processed. If not, the process merely returns to block 36, in an iterative fashion. However, in the event the identified logical link is to be processed is illustrated in block 44. If so, the process passes to block 46. Block 46 illustrates the processing of the link utilizing any parameters passed from the source document counterpart to the target document counterpart and the process then passes to block 48 and returns.

Upon reference to the foregoing those skilled in the art will appreciate that the method and system described herein provide an efficient technique whereby logical links between various document components within a presentation data stream may be maintained, managed and specified such that a receiver of the presentation data stream may elect to process or ignore such logical links based upon a determination of the purpose of the link, as specified within the link logical element (LLE) structured field of the present invention.

While the invention has been particularly shown and described with reference to a preferred embodiment, it will be understood by those skilled in the art that various changes in form and detail may be made therein without departing from the spirit and scope of the invention.

We claim:

1. A method of flexibly managing logical links between document components within a presentation data stream comprising a continuous ordered stream of uniquely identified data objects and associated elements, said method comprising the steps of:

defining a link logical element structured field within said presentation data stream;

specifying within said link logical element structured field one of the following components as a source of origination for a selected logical link: a document; a page group; a page; an overlay; a process element; a rectangular area; a data object; or a non-native data object;

specifying within said link logical element structured field a target for said selected logical link; and specifying within said link logical element structured field a particular purpose for said selected logical link among a plurality of purposes wherein said selected logical link may be selectively processed or ignored by a receiver of said presentation data stream.

2. The method of flexibly managing logical links between document components within a presentation data stream according to claim 1, wherein said step of specifying within said link logical element structured field a target for a selected logical link comprises the step of specifying one of the following components as a target for said selected logical link: a document; a page group; a page; an overlay; a process element; a rectangular area; a data object; or, a non-native data object.

3. The method of flexibly managing logical links between document components within a presentation data stream according to claim 1, further including the step of specifying within said link logical element structured field at least one parameter to be passed to said target for utilization from said source of origination.

4. The method of flexibly managing logical links between document components within a presentation data stream according to claim 1, wherein said logical link may comprise:

an annotation link for specifying the link from a source document component to a target document component which contains an annotation for said source document component;

an append link for specifying a link from a source document component to a target document component which contains an append for said source document component; or a navigation link for specifying a link from a source document component to a contextually related target document component; and wherein said step of specifying within said link logical element structured field a particular purpose for said selected logical link comprises the step of specifying if said selected logical link is an annotation link, an append link or a navigation link.

5. A system for flexibly managing logical links between document components within a presentation data stream comprising a continuous ordered stream of uniquely identified data objects and associated elements, said system comprising:

means for defining a link logical element structured field within said presentation data stream;

means for specifying within said link logical element structured field one of the following components as a source of origination for a selected logical link: a document; a page group; a page; an overlay; a process element; a rectangular area; a data object; or a non-native data object;

means for specifying within said link logical element structured field a target for said selected logical link; and means for specifying within said link logical element structured field a particular purpose for said selected logical link among a plurality of purposes wherein said selected logical link may be selectively processed or ignored by a receiver of said presentation data stream.

6. The system for flexibly managing logical links between document components within a presentation data stream according to claim 5, wherein said means for specifying within said link logical element structured field a target for a selected logical link comprises means for specifying one of the following components as a target for said selected logical link: a document; a page group; a page; an overlay; a process element; a rectangular area; a data object; or a non-native data object.

7. The system for flexibly managing logical links between document components within a presentation data stream according to claim 5, further including means for specifying within said link logical element structured field at least one parameter to be passed to said target for utilization from said source of origination.

8. A system for flexibly managing logical links between document components within a presentation data stream according to claim 5, wherein said logical link may comprise:

an annotation link for specifying the link from a source document component to a target document component which contains an annotation for said source document component;

an append link for specifying a link from a source document component to a target document component which contains an append for said source document component; or, a navigation link for specifying a link from a source document component to a contextually related target document component and wherein said means for specifying within said link logical element structured field a particular purpose for said selected logical link comprises means for specifying if said selected logical link is an annotation link, an append link or a navigation link.

9. A computer program product for flexibly managing logical links between document components within a data stream comprising a continuous ordered stream of uniquely identified data objects and associated elements, said computer program stored within a storage media and adapted to be utilized within a data processing system, said computer program product comprising:

instruction means for defining a link logical element structured field within said presentation data stream;

instruction means for specifying within said link logical element structured field one of the following components as a source of origination for a selected logical link: a document; a page group; a page; an overlay a process element; a rectangular area; a data object; or a non-native data object;

instruction means for specifying within said link logical element structured field a target for said selected logical link; and instruction means for specifying within said link logical element structured field a particular purpose for said selected logical link among a plurality of purposes wherein said selected logical link may be selectively processed or ignored by a receiver of said presentation data stream.

* * * * *

UNITED STATES PATENT AND TRADEMARK OFFICE
CERTIFICATE OF CORRECTION

PATENT NO. : 5,717,922

DATED : February 10, 1998

INVENTOR(S) : R. H. Hohensee, et al.

It is certified that error appears in the above-identified patent and that said Letters Patent is hereby corrected as shown below:

Column 3 line 53, please change "(OLD)" to –(OID)-.

Signed and Sealed this

Sixth Day of February, 2001

Attest:

Attesting Officer

Q. TODD DICKINSON

Director of Patents and Trademarks